G. L. BORDEN.
DISINTEGRATOR.
APPLICATION FILED DEC. 7, 1912.
1,063,155.
Patented May 27, 1913.
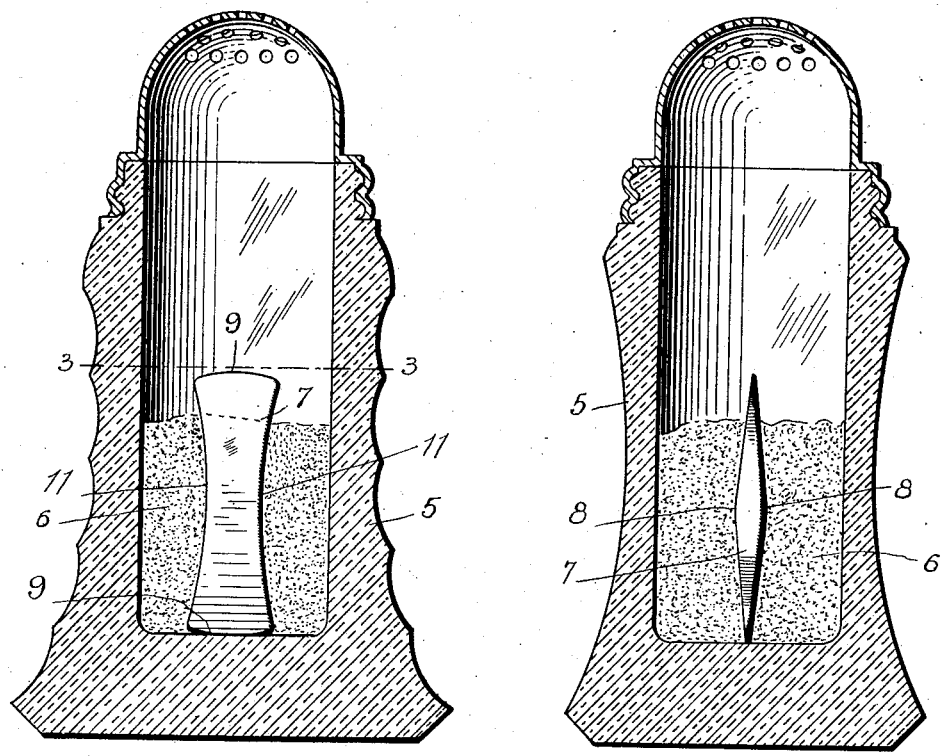
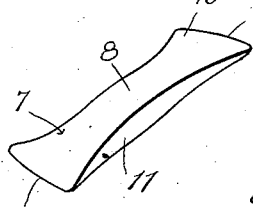
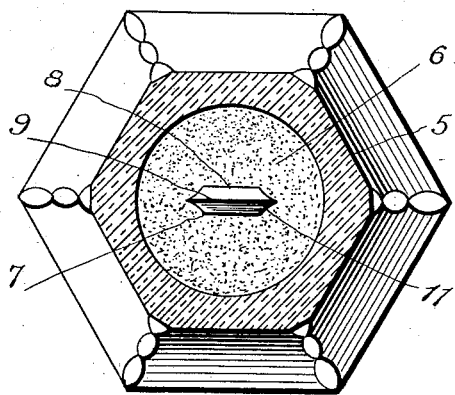
Witnesses
Robert M. Sutphen.
A. I. Hind.
Inventor.
G. L. Borden.
By Watson E. Coleman
Attorney

UNITED STATES PATENT OFFICE.

GEORGE L. BORDEN, OF GROVEVILLE, NEW JERSEY, ASSIGNOR TO ELECTROLYTIC ART METAL COMPANY, OF TRENTON, NEW JERSEY, A CORPORATION OF NEW JERSEY.

DISINTEGRATOR.

1,063,155. Specification of Letters Patent. Patented May 27, 1913.

Application filed December 7, 1912. Serial No. 735,559.

*To all whom it may concern:*

Be it known that I, GEORGE L. BORDEN, a citizen of the United States, residing at Groveville, in the county of Mercer and State of New Jersey, have invented certain new and useful Improvements in Disintegrators, of which the following is a specification, reference being had to the accompanying drawings.

This invention relates to disintegrators for use in condiment holders.

An object of the invention is to provide a disintegrator formed in one piece and of simple construction, also which will be free of sharp projections, which are liable to become caught and thus render the device ineffective.

Another object is to provide a disintegrator provided with a thick central portion and having its ends formed in arcuate cutting edges.

Another object is to provide a device of the above stated character having convex sides and concave edges with the opposite ends curved, thus producing a double wedge-shaped device.

With the above and other objects in view, my invention will be more fully described, and then pointed out in the appended claim which forms a part of this application.

Referring to the drawings, Figure 1 represents a vertical section through a condiment holder of conventional form, showing my improved disintegrator in position therein. Fig. 2 is a similar view at right angles to Fig. 1. Fig. 3 is a cross sectional view on the line 3—3 of Fig. 1, and Fig. 4 is a detail perspective view of the disintegrator removed.

Referring more particularly to the drawing, 5 represents a condiment holder of conventional form, and I have shown the holder partly filled with the condiment 6, in order that the operation of my improved disintegrator 7 may be more clearly understood.

The disintegrator 7 is of double wedge-shape construction, having a thick central portion 8 and arcuate cutting edges 9 formed at its opposite ends. While the opposite sides of the device are convex, the edges are concave, as shown at 11, the sides being designated by the numeral 10. Owing to the specific construction of the device, as just described, the disintegrator will assume an upright position in the condiment, and by shaking the condiment holder, the disintegrator will be forced to travel through the condiment and break up lumps and separate the grains thereof.

As there are no points or projections on this device, and the only portions to which resistance may be offered are the concave edges, it will be impossible for the disintegrator to become caught. It will, therefore, be seen that the device is automatic in operation and therefore, highly efficient and effective.

What is claimed is:—

A disintegrator having convex sides and concave edges, the ends being of arc-shape and adapted to serve as cutting edges.

In testimony whereof I hereunto affix my signature in the presence of two witnesses.

GEORGE L. BORDEN.

Witnesses:
   FREDERICK R. BROWN,
   EDWIN M. THORNE.

---

Copies of this patent may be obtained for five cents each, by addressing the "Commissioner of Patents, Washington, D. C."